United States Patent
Harvey et al.

(10) Patent No.: US 7,573,422 B2
(45) Date of Patent: Aug. 11, 2009

(54) ADVANCED POWER MANAGEMENT FOR SATELLITE POSITIONING SYSTEM

(75) Inventors: Robert Shaw Harvey, San Jose, CA (US); Gengsheng Zhang, Cupertino, CA (US); Lionel J. Garin, Palo Alto, CA (US); Wendell Edwin Innis, Ben Lomond, CA (US); Stefan Witanis, San Jose, CA (US)

(73) Assignee: SiRF Technology Holdings, Inc., San Jose, CA (US)

( * ) Notice: Subject to any disclaimer, the term of this patent is extended or adjusted under 35 U.S.C. 154(b) by 0 days.

(21) Appl. No.: 10/489,525

(22) PCT Filed: Sep. 14, 2002

(86) PCT No.: PCT/US02/30256

§ 371 (c)(1),
(2), (4) Date: Jul. 23, 2004

(87) PCT Pub. No.: WO03/025618

PCT Pub. Date: Mar. 27, 2003

(65) Prior Publication Data

US 2005/0083230 A1 Apr. 21, 2005

Related U.S. Application Data

(60) Provisional application No. 60/322,329, filed on Sep. 14, 2001.

(51) Int. Cl.
*G01S 5/14* (2006.01)
*H04B 1/16* (2006.01)
*G06F 1/32* (2006.01)

(52) U.S. Cl. .................. 342/357.06; 455/343.1; 713/324; 713/320

(58) Field of Classification Search ............ 242/357.06, 242/357.12; 455/343.1; 713/324, 320
See application file for complete search history.

(56) References Cited

U.S. PATENT DOCUMENTS

| | | | | |
|---|---|---|---|---|
| 5,592,173 A | * | 1/1997 | Lau et al. | 342/357.12 |
| 5,848,376 A | * | 12/1998 | Steiner et al. | 701/213 |
| 5,874,914 A | * | 2/1999 | Krasner | 342/357.12 |
| 5,933,782 A | | 8/1999 | Nakano et al. | |
| 6,067,044 A | * | 5/2000 | Whelan et al. | 342/357.07 |
| 6,115,595 A | * | 9/2000 | Rodal et al. | 455/333 |
| 6,121,921 A | * | 9/2000 | Ishigaki | 342/357.08 |
| 6,212,133 B1 | | 4/2001 | McCoy et al. | |

(Continued)

FOREIGN PATENT DOCUMENTS

JP 9-512103 10/1995

(Continued)

*Primary Examiner*—Gregory C Issing
(74) *Attorney, Agent, or Firm*—Pillsbury Winthrop Shaw Pittman LLP

(57) ABSTRACT

A power management system for managing power in a wireless device having a SPS receiver, communication device and a power source, the power management is described. The power management system may include a real-time clock, an input/output device, a radio frequency front-end and a SPS engine in signal communication with the real-time clock, input/output device and radio frequency front-end, the SPS engine capable of powering down itself, the input/output device and radio frequency front-end in response to determining a mode of operation.

28 Claims, 7 Drawing Sheets

U.S. PATENT DOCUMENTS

| | | |
|---|---|---|
| 6,282,495 B1 | 8/2001 | Kirkhart et al. |
| 6,696,982 B2 * | 2/2004 | Yoshioka et al. ............ 340/988 |

FOREIGN PATENT DOCUMENTS

| | | |
|---|---|---|
| JP | 8-304526 | 11/1996 |
| JP | 9-133756 | 3/1997 |
| JP | 10-038993 | 2/1998 |
| JP | 10-206520 | 8/1998 |
| JP | 11-166827 | 6/1999 |
| JP | 10-020014 | 9/2000 |
| JP | 2001-042023 | 2/2001 |
| WO | WO 1997/033382 | 9/1997 |

* cited by examiner

ADVANCED POWER MANAGEMENT FOR SATELLITE POSITIONING SYSTEM

CROSS-REFERENCE TO RELATED APPLICATIONS

This application claims the benefit of Provisional Patent Application Ser. No. 60/322,329, filed on Sep. 14, 2001, and entitled "Advanced Power Management For Global Positioning System Receivers," which is herein incorporated by reference.

BACKGROUND OF THE INVENTION

1. Field of the Invention

This invention relates generally to Satellite Positioning Systems ("SPS") devices, and in particular to a SPS device capable of providing fast update rates while being power conscious.

2. Related Art

The worldwide utilization of wireless devices such as two-way radios, pagers, portable televisions, personal communication system ("PCS"), personal digital assistants ("PDAs") cellular telephones (also known a "mobile phones"), Bluetooth, satellite radio receivers and Satellite Positioning Systems ("SPS") such as Global Positioning Systems ("GPS"), also known as NAVSTAR, is growing at a rapid pace. As the number of people employing wireless devices increases, the number of features offered by wireless service providers also increases, as does the integration of these wireless devices in other products.

However, wireless devices, in order to operate, receive power from portable power sources such as batteries. As these wireless devices increase in complexity by offering greater features and increased integration of different devices in a single product, the amount of power required to properly operate these wireless devices increases. As an example, there is a need for additional power as SPS devices are integrated into other wireless devices such as two-way radios, pagers, portable televisions, PCS, PDAs, cellular telephones, Bluetooth devices, satellite radio and other similar devices.

Unfortunately, energy is expensive and at times in short supply. Generally, portable power sources such as batteries have a limited battery time. Limited battery time results into limited continuous operation time of the wireless device. As an example, if a user (a user may be a person or an application) forgets to power off the wireless device the battery will drain and force the user to re-charge the battery before it can be utilized again.

However, for typical SPS applications, SPS devices do not have to operate continuously because a user may not need or desire to obtain the positional information of the SPS device (also known as a "fix" of the SPS device) continuously. This is generally true for applications involving a slow moving wireless device in an "open sky" (i.e., there are no obstructions to prevent the viewing of available satellites) environment. Examples of this situation may include traveling in an automobile on an open road, a marine vehicle (such as a ship or boat) in open waters, or hiking on an open path with a wireless device (such as a cellular telephone) with an integrated SPS receiver. A user may only need fixes at specific times (such as every 20 to 300 seconds) or on demand (such as when the user places an E911 call based on the new Federal Communication Commissions' "FCC" guidelines). As a result, operating the SPS receiver continuously in these situations would be a waste of limited power and result in shorter operation times for the wireless device. Therefore, there is a need in the art for a power management scheme capable of regulating the amount of power consumed by the SPS device based on the needs of wireless device and user.

SUMMARY

A power management system for managing power in a wireless device having a SPS receiver, communication device and a power source, the power management is disclosed. The power management system may include a real-time clock, an input/output device, an radio frequency front-end and a SPS engine in signal communication with the real-time clock, input/output device and radio frequency front-end, the SPS engine capable of powering down itself the input/output device and radio frequency front-end in response to determining a mode of operation.

The power management system typical operates by obtaining a position of the wireless device with the SPS receiver, determining the mode of operation of the SPS receiver and adjusting an amount of power supplied by the power source to the SPS receiver in response to the determined mode of operation.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following Figures. The components in the Figures are not necessarily to scale, emphasis instead being placed upon illustrating the principles of the invention. Moreover, in the Figures, like reference numerals designate corresponding parts throughout the different views.

DETAILED DESCTIPTION

Figure 1:
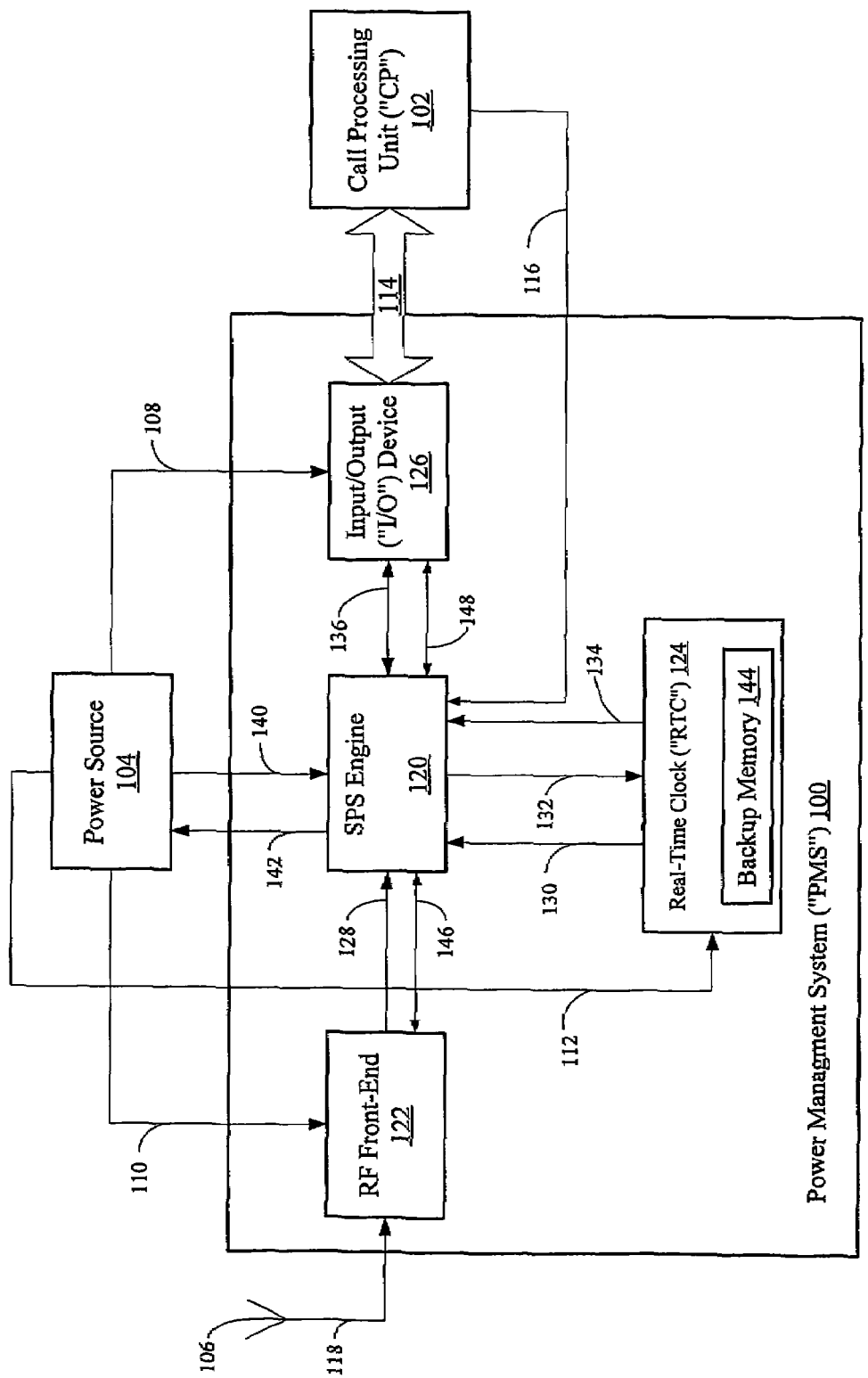
FIG. 1 is a block diagram illustrating an example implementation of a power management system ("PMS").

In FIG. 1, a block diagram of an example implementation of a power management system ("PMS") 100 is illustrated. The PMS may be in signal communication with a communication unit such as a processing ("CP") unit 102, power source 104 and an antenna 106 via signal paths 108, 110, 112, 114, 116 and 118. The PMS 100 may include a satellite positioning system ("SPS") engine 120, a radio frequency ("RF") front-end 122, a real-time clock ("RTC") 124 and an input/output ("I/O") device 126. The SPS engine 120 is in signal communication with RF front-end 122, RTC 124, I/O 126, power source 104 and CP unit 102 via signal paths 128, 130, 132, 134, 136, 140, 142 and 116, respectively. The RTC 124 provides the SPS engine with a clock signal 130 and may include a backup memory 144. The power source 104 may be a battery.

Figure 2:
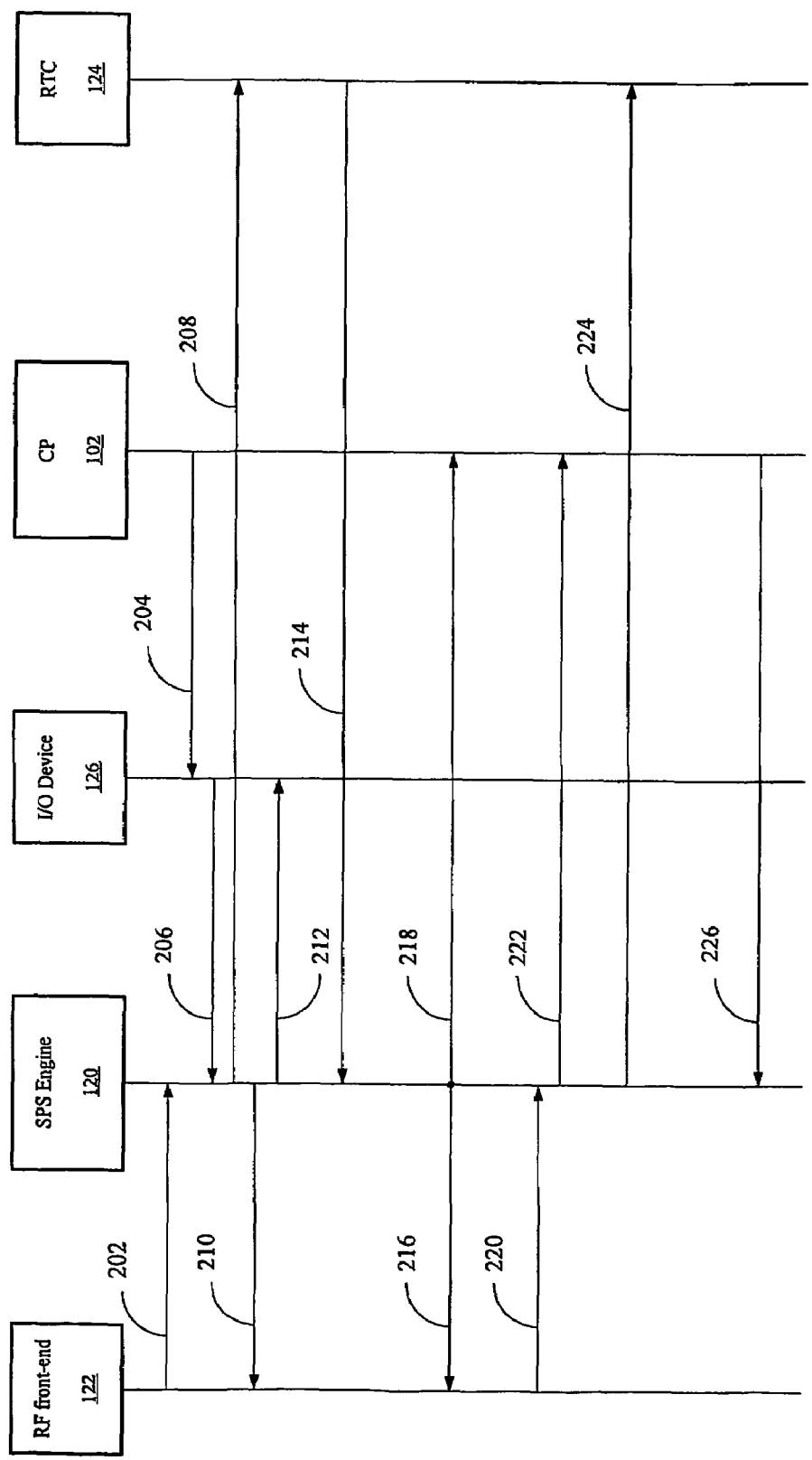
FIG. 2 is a signal flow diagram illustrating an example method of operation of the PMS shown in FIG. 1.

FIG. 2 is a signal flow diagram 200 illustrating an example operation of the PMS 100. In general, the PMS 100 first obtains satellite measurement data from the RF front-end 122 via signal path 128 (signal 202). The SPS engine 120 then calculates a fix, where a "fix" is the position (i.e., a "fixed position"), of the SPS receiver at a given time. The SPS engine 120 then stores the fix data and the time ("To") it took the SPS receiver to acquire the fix in a SPS memory (not shown but optionally located within the SPS engine 120). The I/O 126 receives a mode of operation request from the CP 102, via signal path 114, (signal 204) and passes it to the SPS engine 120 via signal path 136 (signal 206). The PMS 100 has two modes of operation. The first mode is a "duty cycle" mode and the second mode is time-between fixes mode ("TBF mode"). In the duty cycle mode, the PMS 100 operates in a manner to maximize the lifetime of the power source 104. In the TBF mode, the PMS 100 is set so that the SPS receiver produces fixes at a specific time.

In response to the mode requested by the CP 102, the SPS engine 120 prepares to power down itself and the RF front-end 122 and I/O 126 in order to lower the power consumption of the PMS 100. The SPS engine 120 first programs the RTC 124, via signal path 132 (signal 208), with an alarm signal. The alarm signal contains the information needed by the RTC 124 to wakeup the SPS engine 120 once it is powered down in a sleep mode of operation. The RTC 124 may store the information from the alarm signal in the backup memory 144. The SPS engine 120 then powers down the RF front-end 122, via signal path 146 (signal 210), and I/O 126, via signal path 148 (signal 212), by ordering the RF front-end 122 and I/O 126 to no longer accept power, via signal path 110 and 108, respectively, from the power source 104. The SPS engine 120 then powers itself down, via signal path 142, and no longer accepts power from the power source 104 via signal path 140.

The RTC 124 then sends a wake up signal to the SPS engine 120 (signal 214), via signal path 134, based on the information provided by the alarm signal. In response, to receiving the wakeup signal, the SPS engine 120 powers up itself, the I/O 126 (signal 216) and RF front-end 122 (signal 218), via signal paths 148 and 146, respectively. The SPS engine 120 then obtains new satellite measurement data from the RF front-end 122, via signal path 128 (signal 220), and again powers down the RF front-end 122 (signal 222). The SPS engine 120 then calculates a fix for the PMS 100. Once the fix is obtained, it is sent to the CP 102 via the I/O 126. The SPS engine 120 then recalculates the off-time and on-time needed for a power duty cycle that will maintain the power consumption of the PMS 100 to a desired level. The SPS engine 120 then re-programs the RTC 124, via signal path 132 (signal 224), with a new alarm signal and the process repeats. It is appreciated that the CP 102 may wakeup the SPS engine 120 at any time providing an external interrupt message via signal path 116 (signal 226).

Figure 3:
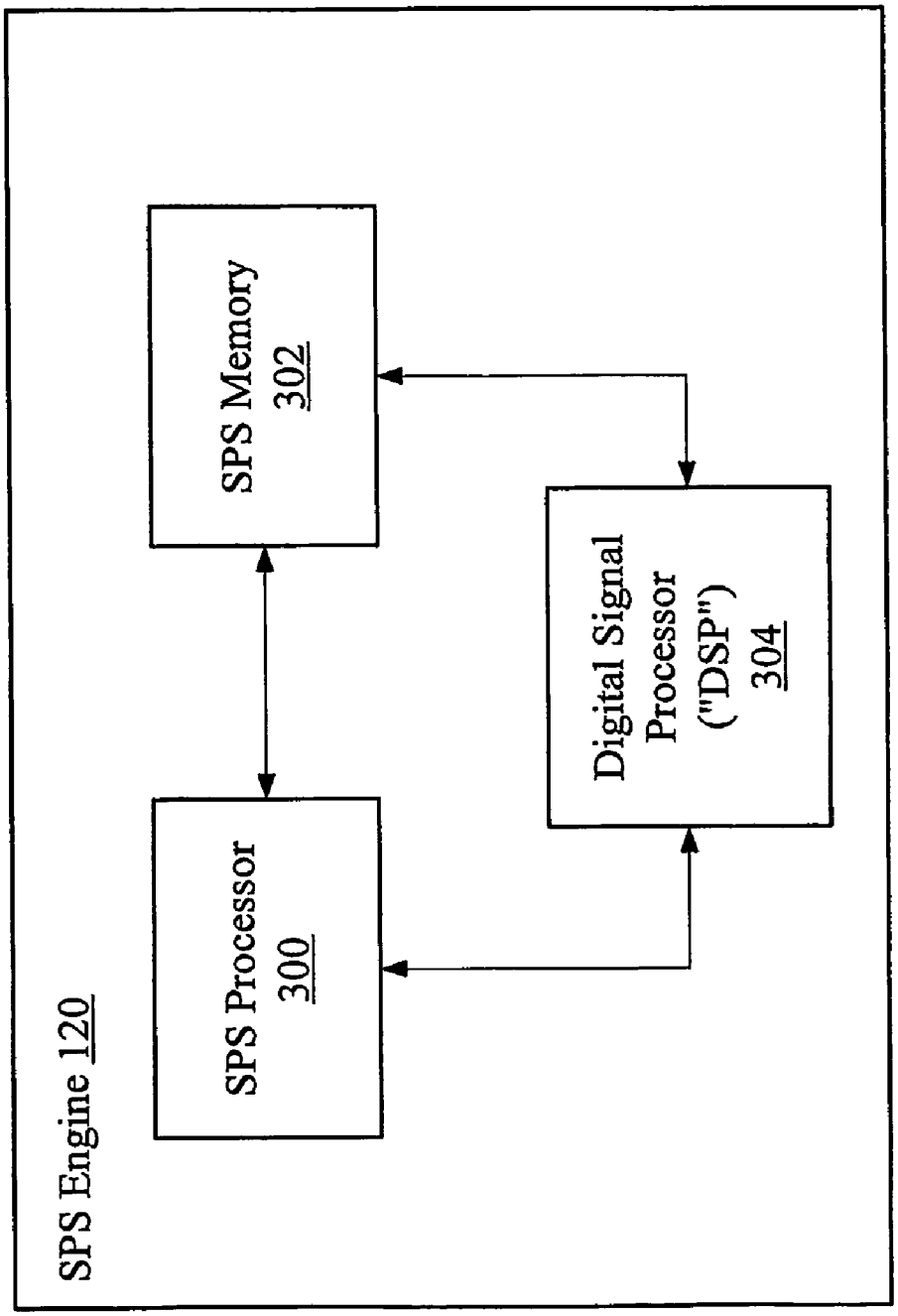
FIG. 3 is a block diagram illustrating an example implementation of a SPS engine block shown in FIG. 1.

FIG. 3 shows an example implementation of the SPS engine 120. The SPS engine 120 is a control and processing section of a SPS receiver. Examples of the SPS receiver may include SiRFstarI, SiRFstarII and SiRFstarIII GPS receiver produced by SiRF Technology, Inc. of San Jose, Calif., GPSOne GPS receiver produced by Qualcomm Incorporated of San Diego, Calif., or any other GPS receiver. The SPS engine 120 may include a SPS processor 300, GPS memory 302 and a digital signal processor ("DSP") 304. The RF front-end 122 may be any general front-end of a receiver for receiving SPS such as global positioning system ("GPS") signals. Examples of the RF front-end 122 may include GRF2i produced by SiRF Technology, Inc. of San Jose, Calif., MRFIC1505 produced by Motorola, Inc. of Schaumburg, Ill., or any other similar SPS RF front-end. The I/O 126 may be a universal asynchronous receiver/transmitter ("UART") or similar input/output device or interface. It is appreciated by one skilled in the art that the SPS engine 120, I/O 126 and RTC 124 may be integrated into one unit such as, for example, GSP2e produced by SiRF Technology, Inc. of San Jose, Calif.

As an example operation, a user (not shown) interfaces with the CP 102. The user may be a person or an application (not shown) from another system (not shown) such as handset processor in a cellular telephone (not shown) or a network server (not shown) is signal communication with the cellular telephone. As before, the PMS 100 has two modes of operation. In the duty cycle mode, the PMS 100 is set by the user to operate in a manner that maximizes the power source 104 life. The TBF mode is set by the user to assure that the SPS receiver produces fixes at a specific time.

If the duty cycle mode (also known as "duty priority") is selected, the PMS 100 first obtains a fix for the SPS receiver. The PMS 100 determines the time ("$T_0$") it took the SPS receiver to acquire the fix. Once the PMS 100 determines $T_0$, the PMS 100 attempts to conserve power from the power source 104 by selectively powering down (i.e., placing in sleep mode) the RF front-end 122, I/O 126 and SPS engine 120 for a certain amount of time ("$T_{Off}$") and then powering up the RF front-end 122, I/O 126 and SPS engine 120 for another certain amount of time ("$T_{On}$") based on the duty cycle needed to maintain a desired power consumption for the PMS 100. The effect of this is that the time between subsequent fixes ("$T_{TBF}$") is a variable number. $T_{TBF}$ is generally stable when the signal conditions are not varying but generally the PMS 100 will not attempt to main $T_{TBF}$ constant. Typically, $T_{On}=T_0$ and $$T_{Off} = T_{On}\left(\frac{1 - \text{duty cycle}}{\text{duty cycle}}\right).$$

It is appreciated that while the PMS 100 will not normally attempt to maintain a constant $T_{TBF}$, the PMS 100 will attempt to maintain a constant $T_{TBF}$ when the calculated $T_{Off}$ would result in a smaller $T_{TBF}$ than requested by the user. In this case, the $T_{Off}$ will be extended to give the requested $T_{TBF}$.

If the TBF mode (also known as "TBF priority mode") is selected instead, the PMS 100 first obtains a fix for the SPS receiver then the PMS 100 determines $T_0$. Once the PMS 100 determines $T_0$, the PMS 100 attempts to conserve power from the power source 104 by selectively powering down the RF front-end 122, I/O 126 and SPS engine 120 for $T_{Off}$ and then powering up the RF front-end 122, I/O 126 and SPS engine 120 for another $T_{On}$ based the desired $T_{TBF}$. Typically, $T_{TBF}$ is determined by the relation $T_{Off}=T_{TBF}-T_{On}$. If the $T_{TBF}$ is to small (i.e., $T_{On}$ is equal to or greater than $T_{TBF}$) for the PMS 100 to power down and then up again, the PMS 100 will be set to full power mode.

Figure 4:
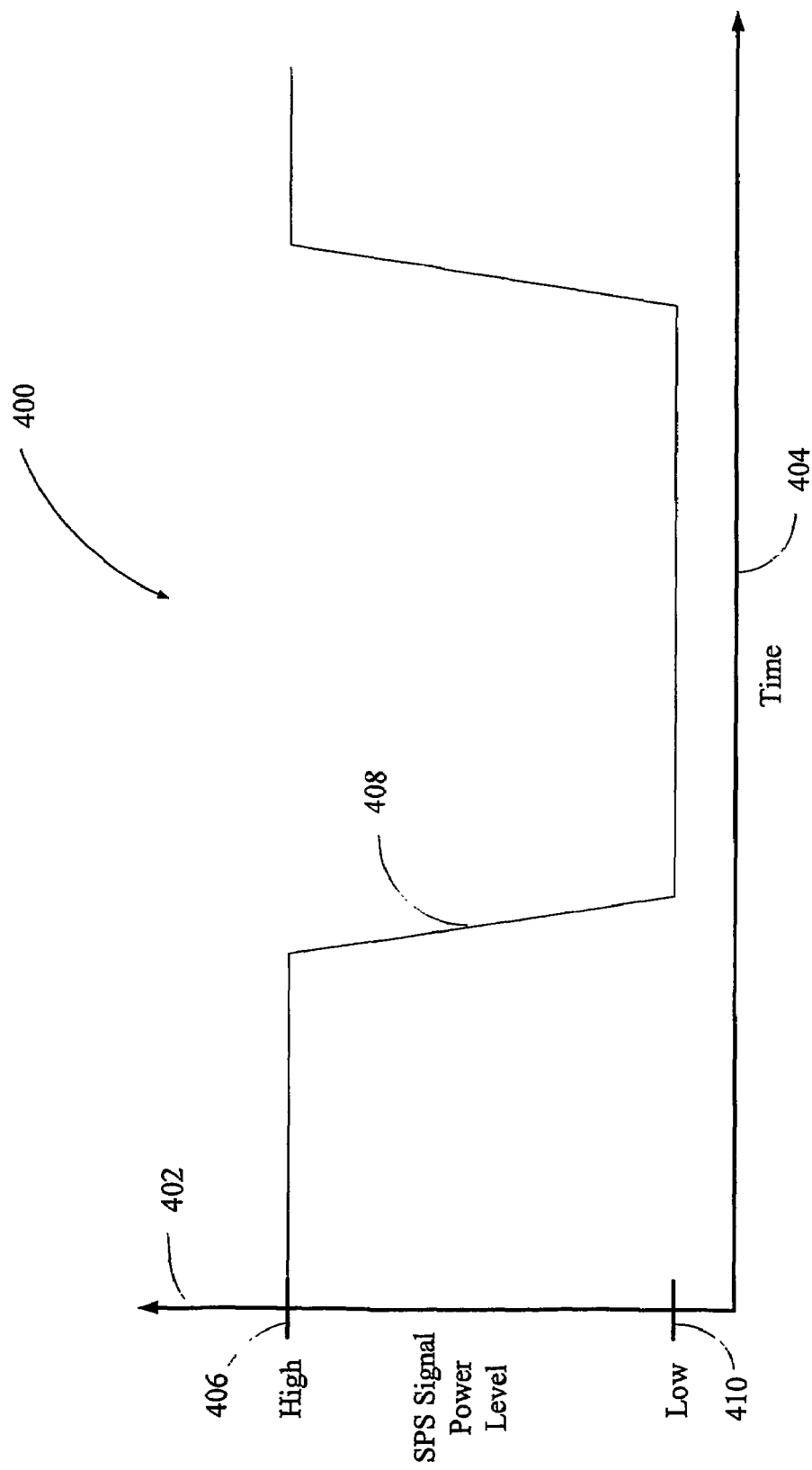
FIG. 4 is a graphical plot of SPS signal power level versus time.

Beyond the user selections, the environment effects the operation of the PMS 100 in both the duty priority and TBF priority modes. In an unobstructed environment (known as "open sky") the SPS receiver in the PMS 100 will receive relatively high power signals from the available satellites. In FIG. 4, a graphical plot 400 of SPS signal power level 402 versus time 404 is shown. In an open sky environment the received SPS signal power level at the PMS 100 is relatively high 406. However, if the wireless device leaves this open sky environment and enters 408, as an example, an obstructed environment (such as entering a structure or an area with mountains, trees and other types of obstructions) the received SPS signal power level drops to a relatively low level 410. As a result of the environment, the PMS 100 will need more time to acquire the signals and generate a fix.

Figure 5:
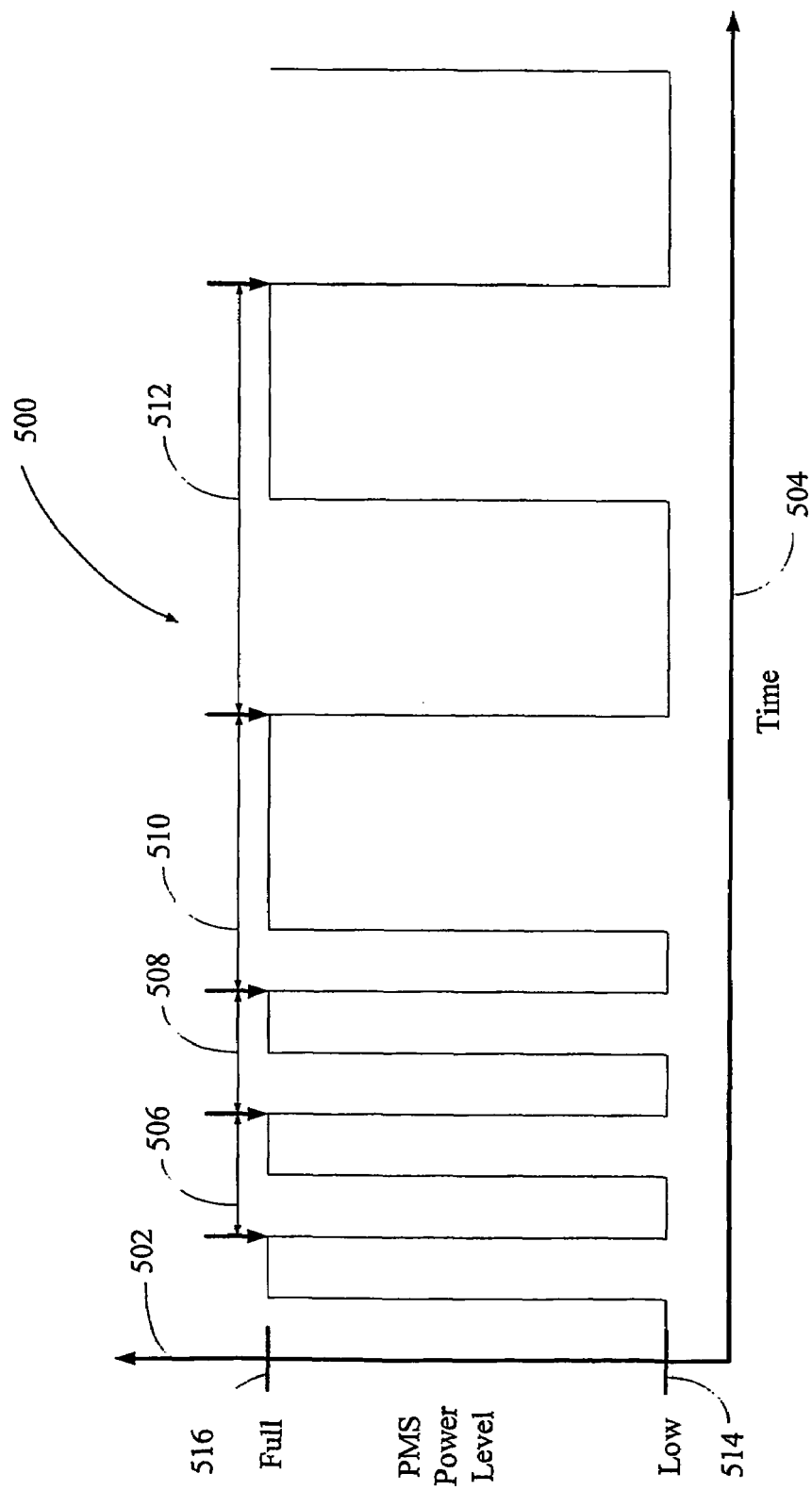
FIG. 5 is a graphical plot of PMS operational power versus time in a duty priority mode.

In FIG. 5, a graphical plot 500 of PMS 100 operational power 502 versus time 504 in a duty priority mode is shown. The time values correspond to the time values in FIG. 4. In FIG. 5, $T_{TBF}$ 506, 508, 510 and 512 are shown as variable based on the duty cycle of the PMS 100 powering down to low power 514 (also known as "tricklestate") and then power back up to full power 516. As the received SPS signal power levels drop 408, the PMS 100 determines that the SPS receiver requires more time in acquiring a fix that it originally needed when the received SPS signal power levels where high 406. The PMS 100, in a duty priority mode, recognizes that in order to get a fix the needed $T_{On}$ is longer than before so the PMS 100 increases the $T_{Off}$ in order to maintain the same duty cycle. As a result, the PMS 100 changes the $T_{TBF}$ based on the received SPS signal power.

Figure 6:
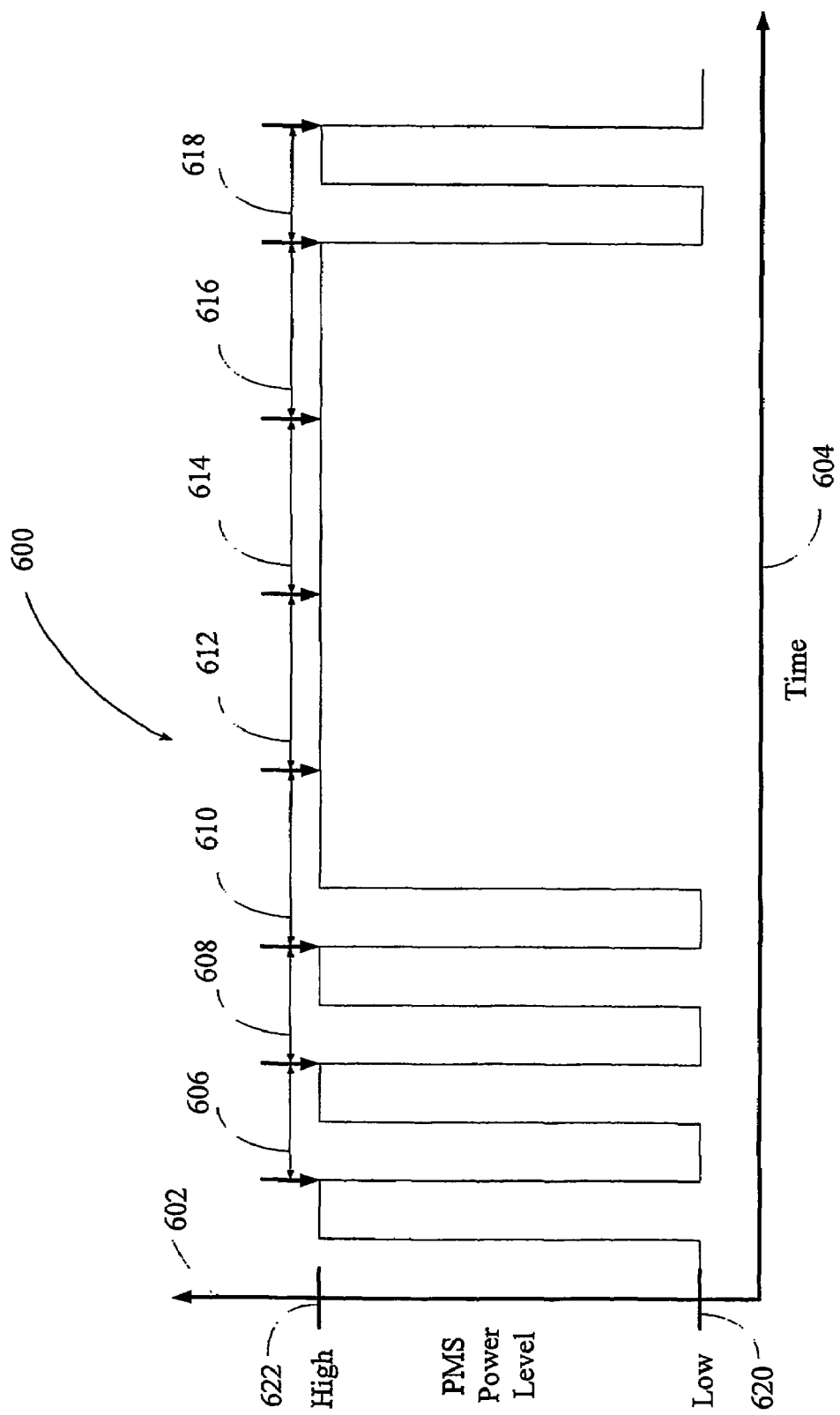
FIG. 6 is a graphical plot of PMS operational power versus time in a time between fix ("TBF") priority mode.

In FIG. 6, a graphical plot of PMS 100 operational power 602 versus time 604 in a TBF priority mode is shown. Again, the time values correspond to the time values in FIG. 4. In FIG. 6, $T_{TBF}$ 606, 608, 610, 612, 614, 616 and 618 are shown as variable based on the duty cycle of the PMS 100 powering down to low power 620 to the tricklestate and then power back up to full power 622. Similar to FIG. 5, as the received SPS signal power levels drop 408, the PMS 100 determines that the SPS receiver requires more time in acquiring a fix that it originally needed when the received SPS signal power levels where high 406. The PMS 100, in a TBF priority mode, recognizes that in order to get a fix the needed $T_{On}$ is longer than before but if the PMS 100 increases the $T_{Off}$ in order to maintain the same duty cycle, the desired $T_{TBF}$ will not be met. As a result, the PMS 100 meets the desired $T_{TBF}$ by powering up all the components and by operating at full power with no duty cycle. Once the received SPS signal power increases (i.e., the environment improves), the PMS 100 will again begin to power down the system as needed.

Figure 7:
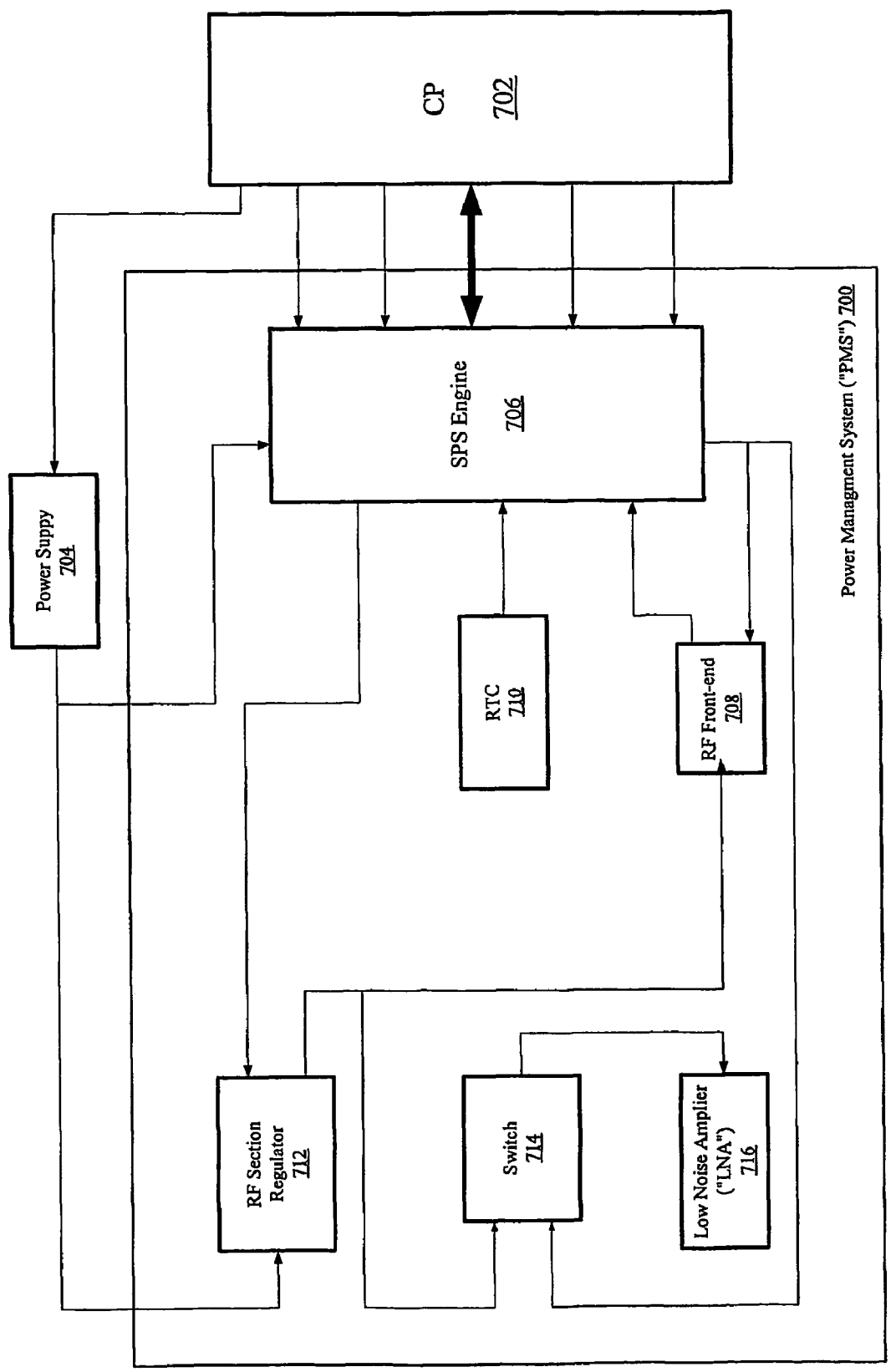
FIG. 7 is a block diagram illustrating another example implementation of the PMS.

FIG. 7 is a block diagram illustrating another example implementation of the PMS 700 in signal communication with a CP 702 and power supply 704. The PMS 700 may include a SPS engine 706, RF front-end 708, RTC 710, RF section regulator 712, switch 714 and low noise amplifier 716. The PMS 700 has three modes of operation including full power, central processor unit ("CPU") only mode and tricklestate.

In the full power state after initial hard reset, the CP 702 toggles the power control 718 of the power supply 704 that powers both the RF regulator 712 and SPS engine 706 via signal paths 720 and 722, respectively. After an initial hard reset, the PWRCTL/GPIO8 line 724 is set to default high, which ensures that the RF regulator 712 is on and GPSCLK 726 is supplied to the SPS engine 706. Software (optionally located in the SPS engine 706) will subsequently toggle GPIO3 728 high (which has a default value of low) to put the RF front-end 708 into full power mode and power the low noise amplifier ("LNA") 716. If GPIO3 728 is low, the RF front-end 708 will be in a "clock-only" mode as long as power is being supplied. Therefore, regardless of the GPIO3 728 state, the RF front-end 708 will generate the GPSCLK 726 signal for clocking the SPS engine 706 as long as RF front-end 708 is powered by the RF section regulator 712.

To enter the CPU-Only mode, the SPS engine 706 will toggle the GPIO3 728 line low. This will place the RF front-end 708 into a clock only mode and disable the LNA 716. Also at this time, the SPS engine 706 will disable some internal clocks to the SPS DSP side (not shown) of the SPS engine 706. The result is that only the interface (such as an ARM) (not shown) and UARTs (not shown) are still clocked. At this mode, none of the internal timer interrupts are available of the SPS engine 70r are available.

To enter the lowest possible power state ("known as the "tricklestate"), the PMS 700 will first enter the CPU-Only state (described above). If the PMS 700 has determined that it is time to shutdown, then the PMS 700 will enable an internal finite-state machine ("FSM") (not shown) to shut down the PMS 700 after all serial communication has been completed. The FSM is entered from a type of background loop once all pending tasks have been completed. The FSM will stop the clock to the SPS engine 706 interface, wait a certain number of RTC 710 cycles and then toggle the PWRCTL/GPIO8 line 724 low (the default number of cycles is 1 and the maximum number of cycles is 7). This will shutdown the RF section regulator 712 which stops the GPSCLK 726.

In the tricklestate, the internal memory (not shown) is maintained through an internal refresh. Once the PMS 700 has entered the tricklestate, only the external interrupt 730, RTC interrupt 732 or a hard power reset from the CP 702 can restart it. If the SPS engine 706 plans on providing another fix after the shutdown, the SPS engine 706 will program the RTC 710 counters (not shown) to wake up the SPS engine 706 in a timely manner. If the required number of fixes has been sent, the SPS engine 706 will enter the tricklestate without setting the RTC 710. The SPS engine 706 will remain essentially dormant until an external interrupt 730 is received from the CP 702 or the SPS engine 706 is reset.

If the SPS engine 706 is in the tricklestate, SPS engine 706 may be woken up by an RTC interrupt 732, an external interrupt 730 or a hard-reset. A hard-reset would be similar to the full power state after initial hard reset situation described above. In the hard-reset case, the contents of the SPS engine 706 memory would be lost and any aiding information would need to be provided again. If the SPS engine 706 receives an interrupt, the PWRCTL/GPIO8 line 724 is driven high by SPS engine 706. The result is that the RF section regulator 712 will be turned on. The RF section regulator 712 then powers the RF front-end 708 and the GPSCLK 726 will again be provided to the SPS engine 706 allowing the interfaces and other components to run. In order to ensure that a stable clock is provided to the SPS engine 706, the FSM will wait a certain number of RTC 710 clock cycles after the PWRCTL/GPIO8 line 724 goes high until the FSM enables the clocks in the SPS engine 706. The default number of cycles that the board waits is 48, and the maximum is 63. In this example, the delay between when the PWRCTL/GPIO8 line 724 gets toggled and when the clocks are enabled in the SPS engine 706 may be about 1.5 ms. The software in an interrupt handler (not shown) will toggle GPIO3 728 high to put the PMS 700 into full power.

The process in FIG. 2 may be performed by hardware or software. If the process is performed by software, the software may reside in software memory (not shown) in the mobile unit or cellular network server. The software in software memory may include an ordered listing of executable instructions for implementing logical functions (i.e., "logic" that may be implement either in digital form such as digital circuitry or source code or in analog form such as analog circuitry or an analog source such an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples "a non-exhaustive list" of the computer-readable medium would include the following: an electrical connection "electronic" having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method for managing power in a wireless device having a SPS receiver, communication device and a power source, the method comprising:
   obtaining a position of the wireless device with the SPS receiver;
   determining a mode of operation of the SPS receiver by:
   receiving a mode command from the communication device, the mode command including a duty priority mode command and a time-between fixes mode command; and
   adjusting an amount of power supplied by the power source to the SPS receiver in response to the determined mode of operation.

2. The method of claim 1, wherein obtaining a fix of the wireless device includes determining a fix of the wireless device in a cold-start operation.

3. The method of claim 1, wherein determining the mode operation includes determining an environment of operation in response to obtaining a position of the wireless device.

4. The method of claim 1, wherein adjusting an amount of power supplied by the power source includes powering up all components of the SPS receiver in response to determining the mode is a full power sub-mode.

5. The method of claim 1, wherein adjusting an amount of power supplied by the power source includes powering down components of the SPS receiver except a processor and a real-time clock in response to determining the mode is a processor only sub-mode.

6. The method of claim 5, wherein adjusting an amount of power is supplied by the power source includes powering down components of the SPS receiver except the real-time clock in response to determining the mode is a tricklestate sub-mode.

7. The method of claim 6, wherein adjusting the amount of power supplied by the power source includes
   programming the real-time clock with the processor for a wakeup time;
   powering down radio frequency front-end and input/output device located in the SPS receiver; and
   powering down the processor.

8. The method of claim 7, wherein the real-time clock includes setting up a wakeup time for the real-time clock to send a wakeup signal to the processor at the wakeup time.

9. The method of claim 8, further including:
   powering up the processor in response to receiving the wakeup signal from the real-time clock; and
   powering up the radio frequency front-end of the SPS receiver;
   obtaining measurement dated from the radio frequency front-end;
   powering down the radio frequency front-end;
   computing a new fix of wireless device in response to obtaining the measurements;
   powering up the input/output device of the SPS receiver;
   sending the computed new fix to the communication device;
   determining a sleep time and wakeup time for the processor;
   setting a new wakeup time for the real-time clock; and
   powering down the processor.

10. A power management system for managing power in a wireless device having a SPS receiver, communication device and a power source, the power management system comprising:
    a real-time clock;
    input/output device;
    an radio frequency front-end; and
    a SPS engine in signal communication with the real-time clock, input/output device and radio frequency front-end, the SPS engine operable to receive a mode command from the communication device, the mode command including a duty priority mode command and a time-between fixes mode command, the SPS engine further operable to power down itself, the input/output device and radio frequency front-end in response to determining a mode of operation.

11. The system of claim 10, wherein the mode command includes a duty priority mode command and a time-between fixes mode command.

12. The system of claim 10, wherein the real-time clock includes a backup memory.

13. A power management system for managing power in a wireless device having a SPS receiver, communication device and a power source, the power management system comprising:
    means for obtaining a position of the wireless device with the SPS receiver;
    means for receiving a mode command from the communication device, the mode command including a duty priority mode command and a time-between fixes mode command; and
    means for adjusting an amount of power supplied by the power source to the SPS receiver in response to the determined mode of operation.

14. The system of claim 13, wherein determining means includes means for determining an environment of operation in response to obtaining a position of the wireless device.

15. The system of claim 14, wherein adjusting means includes means for powering up all components of the SPS receiver in response to determining the mode is a full power sub-mode.

16. The system of claim 15, wherein adjusting means includes means for powering down components of the SPS receiver except a processor and a real-time clock in response to determining the mode is a processor only sub-mode.

17. The system of claim 16, wherein adjusting means includes means for powering down components of the SPS receiver except the real-time clock in response to determining the mode is a tricklestate sub-mode.

18. The system of claim 17, wherein:
adjusting means includes means for programming the real-time clock with the processor for a wakeup time;
means for powering down radio frequency front-end and input/output device located in the SPS receiver; and
means for powering down the processor.

19. The system of claim 18, wherein programming means includes means for setting a wake-up time for the real-time clock to send a wakeup signal to the processor at the wakeup time.

20. The system of claim 19, further including:
means for powering up the processor in response to receiving the wakeup signal from the real-time clock; and
means for powering up the radio frequency front-end of the SPS receiver;
means for obtaining measurement date from the radio frequency front-end;
means for powering down the radio frequency front-end;
means for computing a new fix of wireless device in response to obtaining the measurements;
means for powering up the input/output device of the SPS receiver;
means for sending the computed new fix to the communication device;
means for determining a sleep time and wakeup time for the processor;
means for setting a new wakeup time for the real-time clock; and
means for powering down the processor.

21. A signal-bearing medium having software for managing power in a wireless device having a SPS receiver, communication device and a power source, the signal-bearing medium comprising:
logic configured for obtaining a position of the wireless device with the SPS receiver;
logic configured for determining the more of operation of the SPS receiver, the determining logic including:
logic configured for receiving a mode command from the communication device, the mode command includes a duty priority mode command and a time-between fixes mode command; and
logic configured for adjusting an amount of power supplied by the power source to the SPS receiver in response to the determined mode of operation.

22. The signal-bearing medium of claim 21, wherein determining logic includes
logic configured for determining an environment of operation in response to obtaining a position of the wireless device.

23. The signal-bearing medium of claim 21, wherein adjusting logic includes logic configured for powering up all components of the SPS receiver in response to determining the mode is a full power sub-mode.

24. The signal-bearing medium of claim 21, wherein adjusting logic includes logic configured for powering down components of the SPS receiver except a processor and a real-time clock in response to determining the mode is a processor only sub-mode.

25. The signal-bearing medium of claim 24, wherein adjusting logic includes logic configured for powering down components of the SPS receiver except the real-time clock in response to determining the mode is a tricklestate sub-mode.

26. The signal-bearing medium of claim 25, wherein adjusting logic includes:
logic configured for programming the real-time clock with the processor for a wakeup time;
logic configured for powering down radio frequency front-end and input/output device located in the SPS receiver; and
logic configured for powering down the processor.

27. The signal-bearing medium of claim 26, wherein programming loge includes logic configured for setting a wakeup time for the real-time clock to send a wakeup signal to the processor at the wakeup time.

28. The signal-bearing medium of claim 27, further including
logic configured for powering up the processor in response to receiving the wakeup signal from the real-time clock; and
logic configured for powering up the radio frequency front-end of the SPS receiver;
logic configured for obtaining measurement data from the radio frequency front-end;
logic configured for powering down the radio frequency font-end;
logic configured for computing a new fix of wireless device in response to obtaining the measurements;
logic configured for powering up the input/output device of the SPS receiver;
logic configured for determining a sleep time for the real-time clock; and
logic configured for powering down the processor.

* * * * *